United States Patent [19]
Greene et al.

[11] 3,929,015
[45] Dec. 30, 1975

[54] LINE MOTION AND WATER CURRENT DISC SENSOR

[75] Inventors: Michael L. Greene, Oxon Hill; George J. Moss, Bethesda, both of Md.

[73] Assignee: The United States of America as represented by the Secretary of the Navy, Washington, D.C.

[22] Filed: Apr. 30, 1975

[21] Appl. No.: 573,278

[52] U.S. Cl. .............................. 73/170 A; 73/228
[51] Int. Cl.² ......................................... G01F 1/28
[58] Field of Search...... 73/170 A, 188, 189, 194 R, 73/228, 194 E

[56] References Cited
UNITED STATES PATENTS

| | | | |
|---|---|---|---|
| 3,330,269 | 7/1967 | Pieper | 73/228 X |
| 3,731,531 | 5/1973 | Kaufman et al. | 73/189 |

*Primary Examiner*—Jerry W. Myracle
*Attorney, Agent, or Firm*—R. S. Sciascia; Arthur L. Branning; Melvin L. Crane

[57] ABSTRACT

An instrument for determining velocity of ocean currents and/or frequency and amplitude of strumming mooring lines. A magnetic controlled contact relative to resistance wires controlled by a spring loaded disc operates as a potentiometer to indicate the intended result.

4 Claims, 1 Drawing Figure

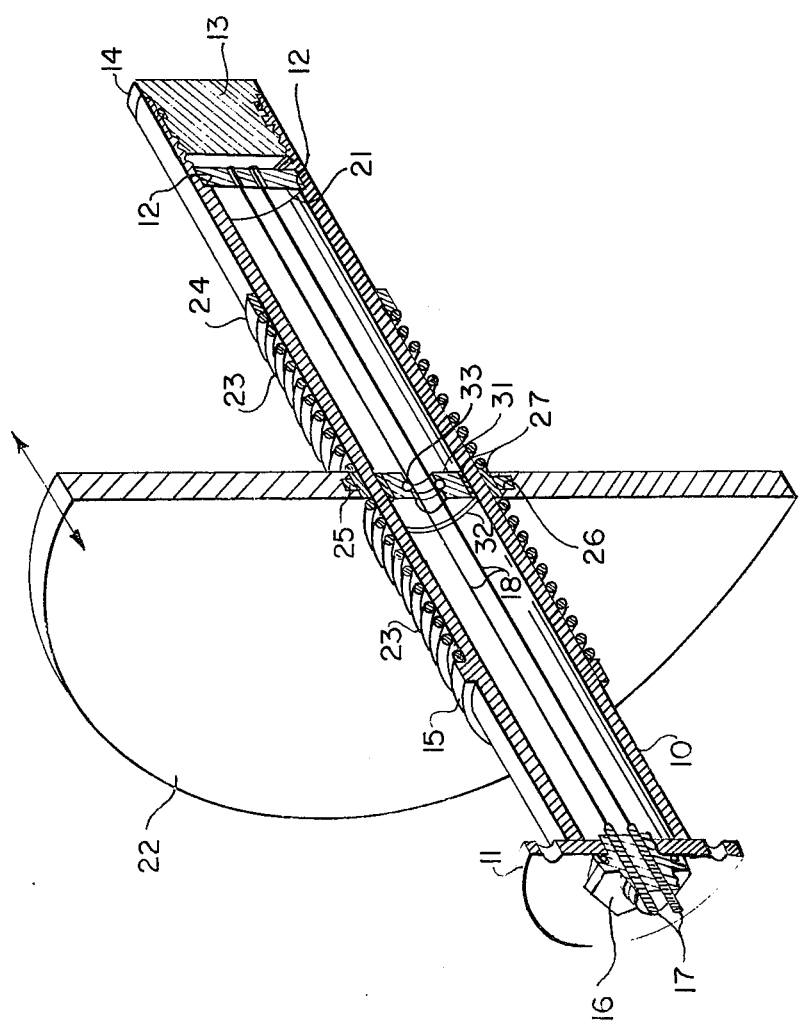

LINE MOTION AND WATER CURRENT DISC SENSOR

BACKGROUND OF THE INVENTION

This invention relates to line motion and water current devices and more particularly to a line motion and current measuring device which has very few movable parts, it is small in size and may be used in shallow as well as deep water.

Heretofore water current sensors have made use of rotating wheels which determine current flow by the rotational velocity of the wheel. Other current meters make use of a magnetic field in which the lines of force are cut by the water to measure the current flow. Frequency and amplitude of strumming mooring lines has been measured by use of integrating accelerometers. Therefore separate instruments have been used for the different measured parameters.

SUMMARY OF THE INVENTION

The device of this invention may be secured in the water for determining current flow or frequency and amplitude of strumming mooring lines. The device includes an aluminum tubular member having parallel electrical lines extending along the length of and inside of the tubular member. A ring type magnetic follower on the inside of the tubular member having a slide-wire thereon in contact with the parallel wires follows a magnetic ring on the outside of and surrounding the aluminum tubular member and operates as a potentiometer. The magnetic ring is mounted on a neutrally buoyant slidable disc which is operative between two opposing stainless steel nonmagnetic springs. Current flow or a force against the disc moves the disc along the length of the tubular member against one of the springs. The magnetic follower follows the disc thereby shortening or lengthening the effective resistance length of the wires within the tubular member. The resistance wires are connected electrically with a recorder or other instruments to indicate the movement of the disc. The displacement of the disc is proportional to the square of the velocity component in the direction of movement.

BRIEF DESCRIPTION OF THE DRAWING

The FIGURE illustrates a cross-sectional view of the device illustrating the relative parts.

DETAILED DESCRIPTION

Now referring to the drawing, there is illustrated a line motion water current disc sensor made in accordance with the teaching of this invention. As shown, the device includes an aluminum elongated tubular member or housing 10 which is closed at one end by a flange 11 and open at the opposite end. The open end is milled along its inner surface a short distance to a smaller thickness than the rest of the body to provide a shoulder 12 inwardly of the end which will be explained later. The milled end portion of the tubular member is threaded along the inner surface to receive therein a threaded end cap 13 that is provided with a larger diameter end 14 that matches with the outer diameter of the tubular member. The tubular member is provided with an integral rim or flat ridge 15 a short distance from the flange which rim extends outwardly from the main body of the housing. The flange 11 is provided with an axial threaded aperture which receives therein an electrical lead terminal 16 through which two spaced electrical leads 17 pass. The electrical leads have noninsulated, bare, resistance wire extensions 18 which pass along the axis of the housing and are secured in a taut manner to an insulator element 21 such as Teflon which is held in place within the tubular housing against the shoulder 12. The flange is also provided with equally spaced apertures with their centers on a circle with the axis as its center by which the device may be secured at its flange for operation.

A neutrally buoyant slidable disc 22 has an axial central aperture so that the disc slides over the housing and is held between two stainless steel nonmagnetic springs 23 which are held in place along the aluminum housing between the rim 15 and a ring or rim 24 which is secured in place on the outside of the tubular housing. The rims 15 and 24 are positioned such that the disc normally be positioned by the springs 23 at the mid point along the length of the resistance wires 18 within the housing. The disc is provided with a steel ring 25 imbedded within a slot 26 in the surface of the central aperture and the face of the central aperture is coated with a coating of Teflon 27 which provides a bearing surface.

The mass of the neutrally buoyant disc determines the response of the instrument herein described to cable strum. The mass of the neutrally buoyant disc may be varied in accordance with the following techniques:

1. The disc may be hollow and contain a small aperture to permit water to enter into the disc.
2. Two discs, which have a space between them, would entrain a mass of water between them.
3. A virtual mass of water will always be entrained by the disc. Therefore, by increasing the diameter of the disc the virtual mass of the disc will be increased.

Opposite the disc within the aluminum housing is a magnetic follower 31, which is provided with a Teflon coated bushing 32 on the outer surface thereof and a slide-wire ring 33 on the inner surface. The slide-wire ring physically contacts each of the bare wires and completes an electrical circuit across the wires. Therefore the slide-wire 33 and resistance wires 18 serve as a potentiometer. The magnetic follower follows the steel ring 25 in the disc as the disc is moved along the surface of the aluminum housing due to a current flow or strumming of moorings lines. The electrical leads 17 are electrically connected to a recording means for measuring the change in resistance due to a change in position of the magnetic follower which follows a change in position of the disc due to the presence of the steel ring within the disc. As the disc is forced by a water current in one direction along the housing, one spring is under compression and the other spring is under tension. Thus, the disc moves with little force by the water due to the spring action. With no force thereon, the disc will assume its neutral position along the length of the aluminum housing and the magnetic follower will lay directly opposite the disc. In operation, the magnetic follower moves axially along the aluminum housing and wires 18 as the disc moves, thereby changing the resistance path of the device.

The device may be employed in different ways. For example, in the ocean where steady state currents are known to exist three of these instruments on three orthogonal axes may be mounted to an instrument case on a mooring line. The instrument case houses the necessary recording means and in addition, a compass, to give direction. The aluminum housing must be long enough to minimize hydrodynamic effects of the instrument case. A steady state flow perpendicular to the disc causes the compression of one of the calibrated springs and a tensioning of the other. The displacement of the disc is proportional to the square of the velocity component in that direction. A resistance or potentiometer measurement at the terminator leads determines the velocity. If the cable on which the instruments are attached starts to strum, the disc normal to the case and parallel to the flow tends to stay relatively stationary in the water with respect to the longitudinal axis of the aluminum tube. A large vane attached to the instrument case would provide the means for positioning a disc in a proper or correct direction to flow. The magnetic follower also stays relatively stationary with respect to the disc. A high frequency change in resistance will be noted because of the rapid periodic motion of the resistance wires in the aluminum tube relative to the stationary slide-wire. In this manner a three-dimensional model of the oscillations of the instrument package in the ocean stream may be calculated from resistance measurements.

In shallow water, the instrument may be attached to a bottom for determining ocean currents. Here, a compass is not necessary if the direction of the instrument at implant is known. Again, three instruments may be used to construct a three-dimensional model of the ocean currents. A steady state water current will have the same effect as stated before. Orbital flow, which has a much lower frequency than cable strum will tend to cause the slidable disc to compress or tension one set of calibrated springs and then the other. This causes a periodic change in the resistance which reflects the orbital motion. The steady state component of flow shows up as an offset of the averaged resistance readings from the null position.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A line motion and water current disc sensor; which comprises,
    a cylindrical elongated housing;
    noninsulated wires secured within said housing along a portion of its length;
    a disc surrounding said housing and adapted for movement along said housing;
    spring means on opposite sides of said disc for normally positioning said disc in a neutral position;
    a magnetic follower within said housing;
    said magnetic follower including an electrical contact thereon for completing an electrical circuit between said noninsulated wires; and
    means on said disc for causing said magnetic follower to move simultaneously with movement of said disc.

2. A line motion and water current disc sensor as claimed in claim 1; wherein,
    said disc is a solid flat plate.

3. A line motion and water current disc sensor as claimed in claim 2; in which,
    said housing includes a flange on one end by which said housing may be secured to a mooring fixture.

4. A line motion and water current disc sensor as claimed in claim 2; wherein,
    said flange end of said housing includes an electrical terminal therein electrically connected with said noninsulated wires.

* * * * *